(12) United States Patent
Adejumo et al.

(10) Patent No.: US 11,041,617 B2
(45) Date of Patent: Jun. 22, 2021

(54) LUMINAIRE WITH AN INTEGRATED CAMERA

(71) Applicant: SIGNIFY HOLDING B.V., Eindhoven (NL)

(72) Inventors: Tunji Adejumo, Peachtree City, GA (US); Nam Chin Cho, Peachtree City, GA (US); Chris Lu, Riverdale, GA (US); Jay Michael Sachetti, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 106 days.

(21) Appl. No.: 16/391,095

(22) Filed: Apr. 22, 2019

(65) Prior Publication Data

US 2019/0323702 A1    Oct. 24, 2019

Related U.S. Application Data

(60) Provisional application No. 62/660,800, filed on Apr. 20, 2018.

(51) Int. Cl.
*F21V 33/00* (2006.01)
*H04L 12/10* (2006.01)
*H04N 5/225* (2006.01)
*H04N 5/232* (2006.01)

(52) U.S. Cl.
CPC ...... *F21V 33/0052* (2013.01); *F21V 33/0076* (2013.01); *H04L 12/10* (2013.01); *H04N 5/2256* (2013.01); *H04N 5/23206* (2013.01)

(58) Field of Classification Search
CPC .. F21V 33/0052; F21V 33/0076; H04L 12/10; H04L 12/2803; H04N 5/2256; H04N 5/23206; H04N 5/23299; H04N 5/2257; G08B 13/19658; G08B 13/1966; G08B 13/19619
See application file for complete search history.

(56) References Cited

U.S. PATENT DOCUMENTS

| | | |
|---|---|---|
| 5,886,738 A | 3/1999 | Hollenbeck et al. |
| 6,812,970 B1 | 11/2004 | McBride |
| 8,622,561 B2 | 1/2014 | Carmody |
| 8,686,664 B2 | 4/2014 | Herbst et al. |
| 8,826,046 B2 | 9/2014 | Lu et al. |
| 9,143,741 B1 | 9/2015 | Fu et al. |
| 9,172,917 B1 | 10/2015 | Fu et al. |
| 9,185,783 B2 | 11/2015 | Holland et al. |
| 9,197,843 B2 | 11/2015 | Mast et al. |

(Continued)

FOREIGN PATENT DOCUMENTS

| | | |
|---|---|---|
| CA | 2908020 | 11/2003 |
| WO | WO 2016005781 | 1/2016 |

*Primary Examiner* — Yogesh K Aggarwal

(57) ABSTRACT

A luminaire includes a terminal block that receives power from a power source, a light source power supply electrically coupled to the terminal block and to a light source, a power converter electrically coupled to the terminal block and to a power over Ethernet injector, a camera coupled to the power over Ethernet injector, and a transceiver electrically coupled to the power converter. The power over Ethernet injector can supply power to and receive data from the camera. The transceiver is also coupled to the power over Ethernet injector and can communicate data to and receive data from the camera.

20 Claims, 9 Drawing Sheets

(56) References Cited

U.S. PATENT DOCUMENTS

| | | | |
|---|---|---|---|
| 9,202,358 B2 | 12/2015 | Miao | |
| 9,275,392 B2 | 3/2016 | Potkonjak | |
| 9,332,621 B2 | 5/2016 | Sagal et al. | |
| 9,345,116 B2 | 5/2016 | Chen | |
| 9,402,294 B2 | 7/2016 | Holland et al. | |
| 9,547,964 B2 | 1/2017 | Skotty et al. | |
| 9,549,110 B2 | 1/2017 | Chien | |
| 9,554,099 B1 | 1/2017 | Dursch | |
| 9,615,066 B1 | 4/2017 | Tran et al. | |
| 9,628,691 B2 | 4/2017 | Berelejis et al. | |
| 9,654,678 B1 | 5/2017 | Fu et al. | |
| 9,787,885 B2 | 10/2017 | Chien | |
| 2003/0197807 A1 | 10/2003 | Wu | |
| 2003/0210340 A1 | 11/2003 | Frederick Romanowich | |
| 2011/0228811 A1* | 9/2011 | Fraden | G01J 5/061 374/130 |
| 2011/0275930 A1* | 11/2011 | Jho | A61M 5/14276 600/424 |
| 2012/0073299 A1* | 3/2012 | Bleeker | F02C 7/25 60/740 |
| 2012/0113646 A1 | 5/2012 | Carmody | |
| 2012/0120243 A1 | 5/2012 | Chien | |
| 2012/0218421 A1 | 8/2012 | Chien | |
| 2012/0271477 A1 | 10/2012 | Okubo et al. | |
| 2013/0038728 A1 | 2/2013 | Kim | |
| 2015/0048758 A1* | 2/2015 | Carrigan | H05B 47/19 315/294 |
| 2015/0276399 A1 | 10/2015 | Breuer et al. | |
| 2015/0362172 A1 | 12/2015 | Gabriel et al. | |
| 2016/0100086 A1 | 4/2016 | Chien | |
| 2016/0134826 A1 | 5/2016 | Scalisi | |
| 2016/0134846 A1 | 5/2016 | Miller et al. | |
| 2016/0173746 A1 | 6/2016 | Chien | |
| 2016/0323489 A1 | 11/2016 | Tang et al. | |
| 2017/0175996 A1 | 6/2017 | Chien | |
| 2017/0206785 A1 | 7/2017 | Kim et al. | |
| 2017/0223807 A1 | 8/2017 | Recker et al. | |
| 2017/0244934 A1 | 8/2017 | Chien | |

* cited by examiner

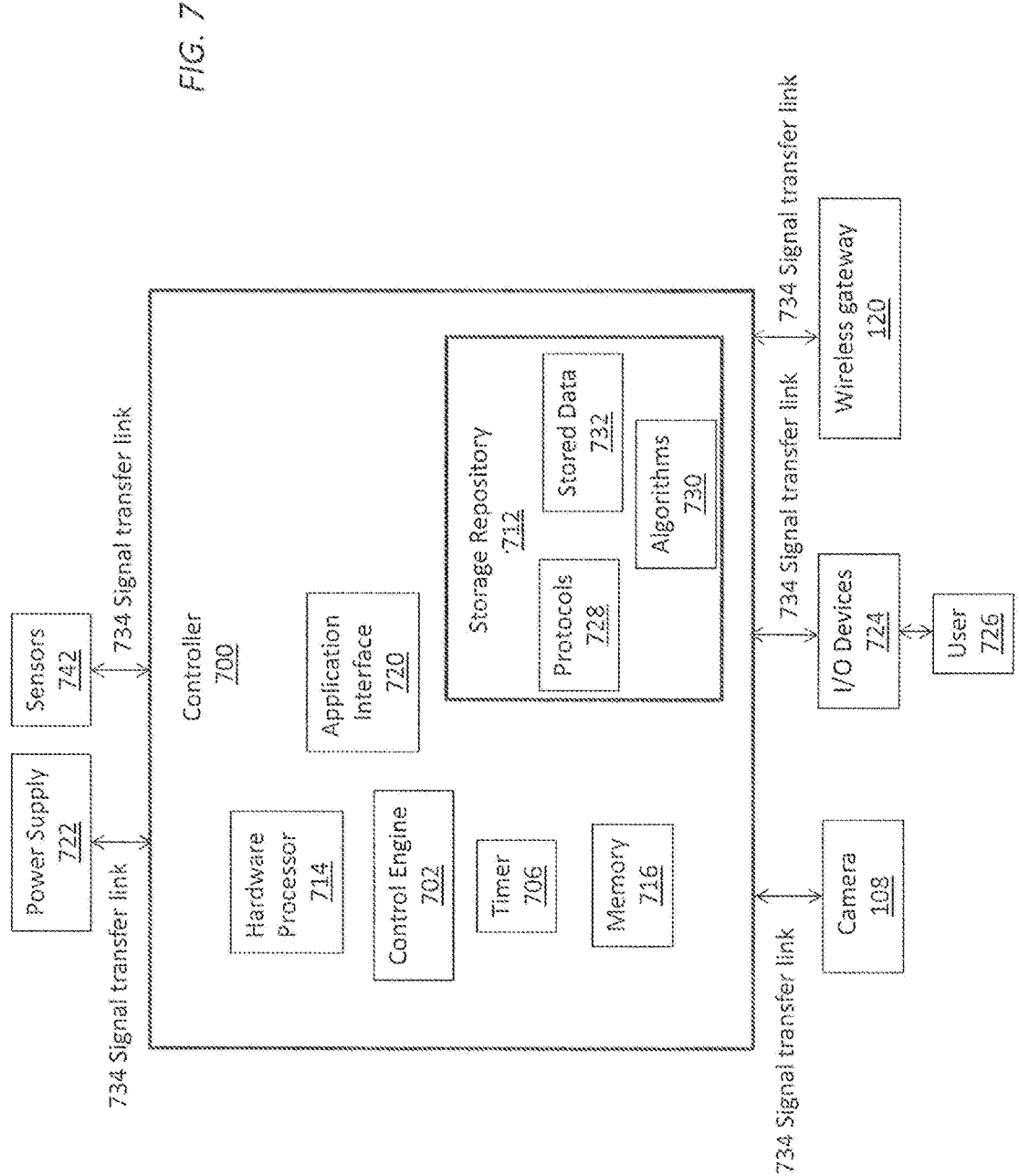

LUMINAIRE WITH AN INTEGRATED CAMERA

RELATED APPLICATIONS

The present application claims priority to U.S. Provisional Patent Application No. 62/660,800 filed Apr. 20, 2018 and titled "Luminaire With An Integrated Camera," the entire contents of which are incorporated herein by reference.

TECHNICAL FIELD

Embodiments described herein relate generally to a luminaire with an integrated camera.

BACKGROUND

The use of cameras is becoming more prevalent for a variety of reasons, including monitoring and security. In addition to being able to record events, the presence of visible cameras can serve as a deterrent to criminal activities. Luminaires provide a unique opportunity for integrating cameras.

SUMMARY

In one example embodiment, the present disclosure is directed to a luminaire comprising a terminal block that receives power from a power source, a light source power supply electrically coupled to the terminal block and to a light source, a power converter electrically coupled to the terminal block and to a power over Ethernet injector, a camera coupled to the power over Ethernet injector, and a transceiver electrically coupled to the power converter. The power over Ethernet injector can supply power to and receive data from the camera. The transceiver is also coupled to the power over Ethernet injector and can receive data from the camera via the power over Ethernet injector. The transceiver can transmit the data from the camera to a remote facility via one or more wired or wireless communication networks. The transceiver can also receive control signals from a remote location via a communication network and provide the control signals to the camera via the power over Ethernet injector.

In another example embodiment, a luminaire can comprise a component housing defining a component housing cavity. The component housing cavity can comprise a terminal block that receives power from a power source, a power converter electrically coupled to the terminal block, a power over Ethernet injector electrically coupled to the power converter, a transceiver that receives power from the power converter, and a thermal shield that protects the components in the component housing cavity. The thermal shield can be disposed on an inner surface of the component housing. The luminaire can also comprise a light source power supply coupled to the terminal block and to a light source. The power over Ethernet injector can be coupled to a camera or another type of sensor and can communicate data between the transceiver and the camera or other sensor.

BRIEF DESCRIPTION OF THE DRAWINGS

The drawings illustrate only example embodiments of luminaires with integrated cameras and are therefore not to be considered limiting of the scope of this disclosure. The elements and features shown in the drawings are not necessarily to scale, emphasis instead being placed upon clearly illustrating the principles of the example embodiments. Additionally, certain dimensions or positions may be exaggerated to help visually convey such principles.

FIG. 7 illustrates an example controller for use with the example embodiments of the disclosure.

DETAILED DESCRIPTION OF EXAMPLE EMBODIMENTS

Figure 1:
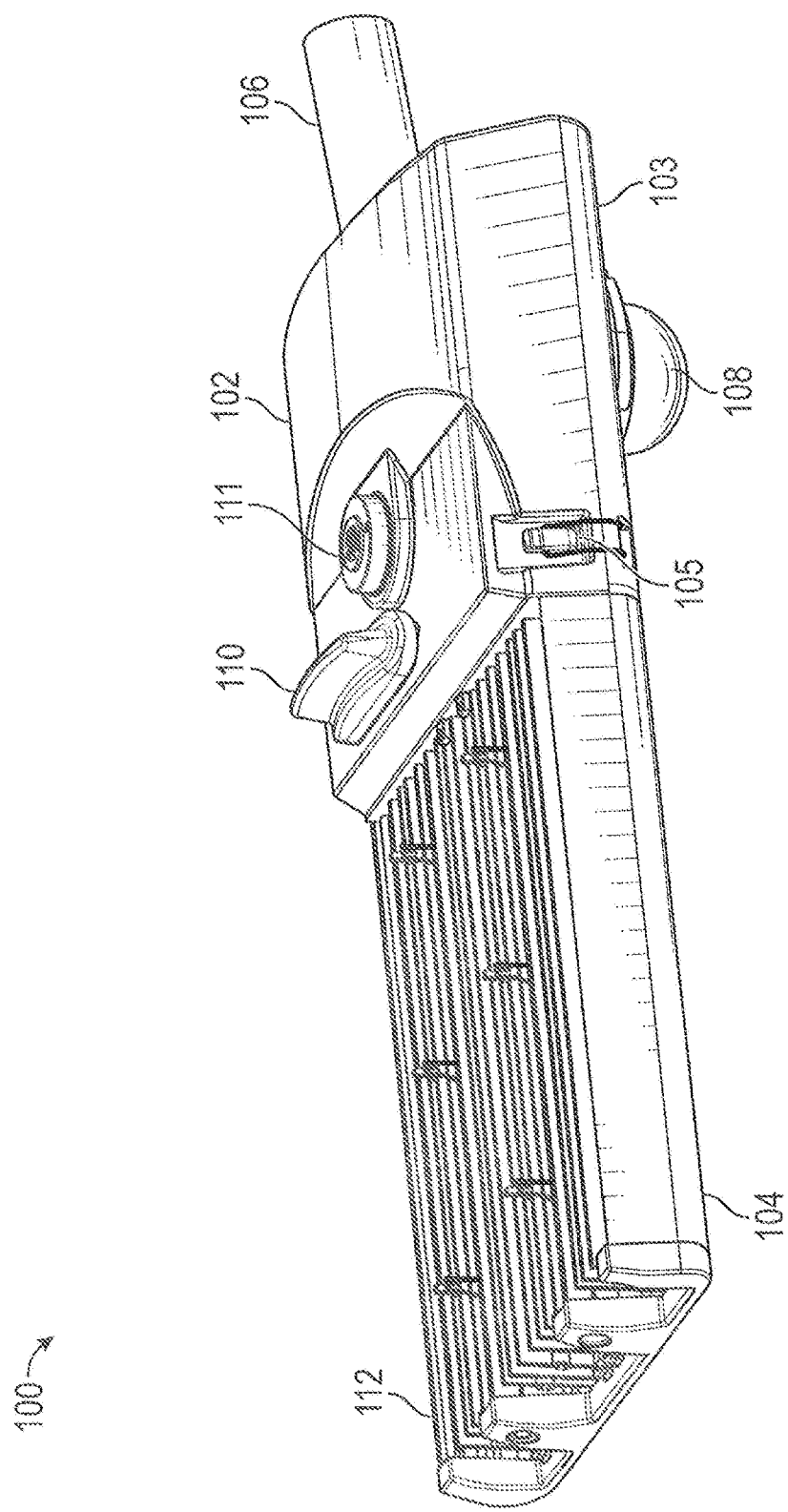
FIG. 1 is a top perspective view of a luminaire with an integrated camera in accordance with an example embodiment.

The example embodiments discussed herein are directed to systems, apparatuses, and methods relating to luminaires with integrated cameras. While outdoor luminaires are shown with an integrated camera in the accompanying figures, it should be understood that the integrated cameras can be implemented in a variety of indoor and outdoor luminaires, including luminaires in garages, stadiums, warehouses, and a variety of other buildings and environments. The luminaires illustrated herein include a single integrated camera, however, in other embodiments the luminaire can include multiple integrated cameras located at various positions on the luminaire. In addition to including multiple cameras, some example embodiments of the luminaire can incorporate different types of cameras, such as one camera that provides higher resolution and another camera that provides pan, tilt, and zoom functions. Example embodiments can be used in any of a number of applications and/or environments.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

The example luminaires with an integrated camera described herein can be made of one or more of a number of suitable materials to allow the luminaire and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of the example luminaires (or portions thereof) described herein can be made from a single piece (as from a mold, injection mold, die cast, or extrusion process). In addition, or in the alternative, a luminaire with an integrated camera (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of luminaires with an integrated camera. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
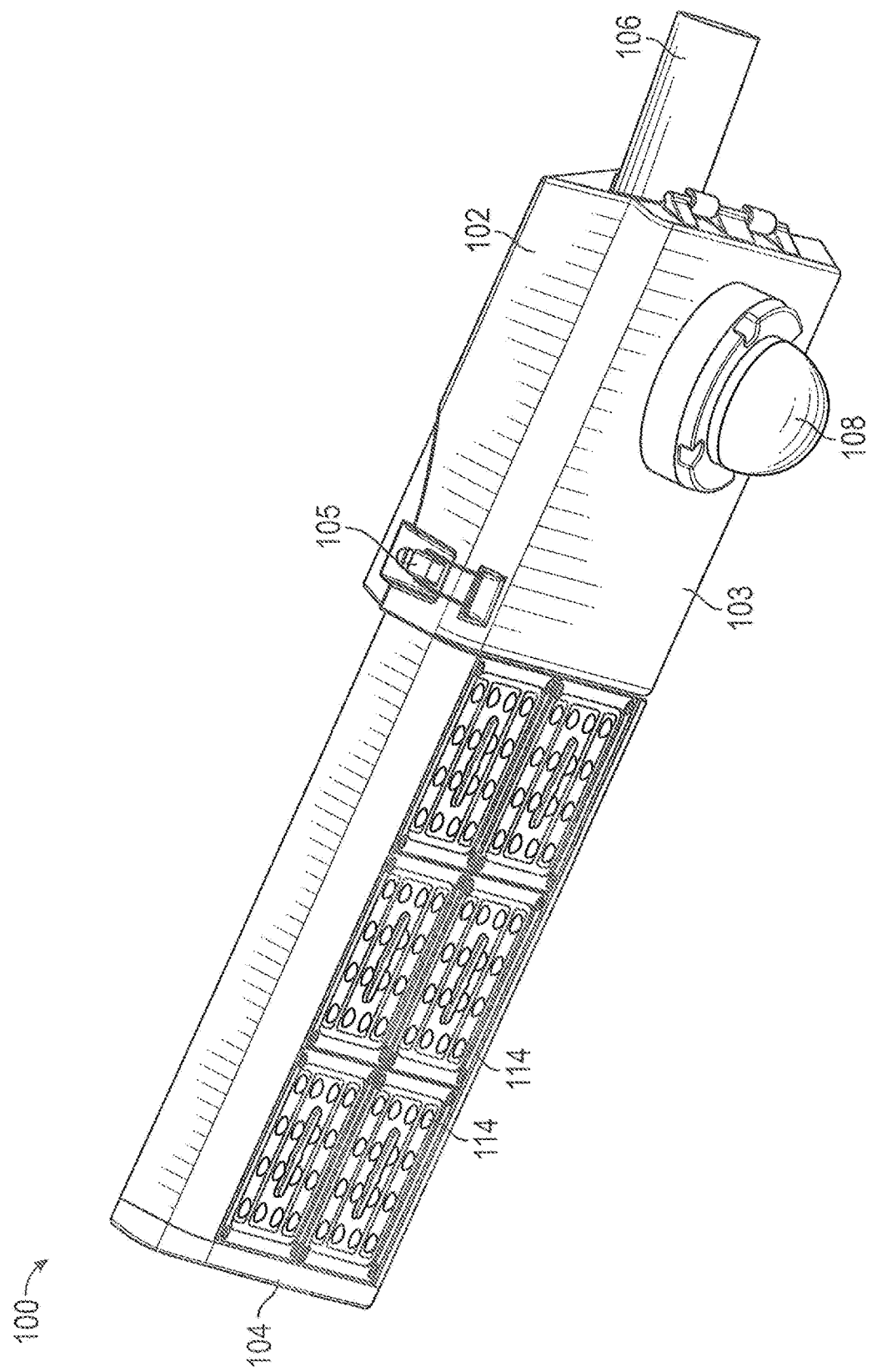
FIG. 2 is a bottom perspective view of a luminaire with an integrated camera in accordance with an example embodiment.
Figure 3:
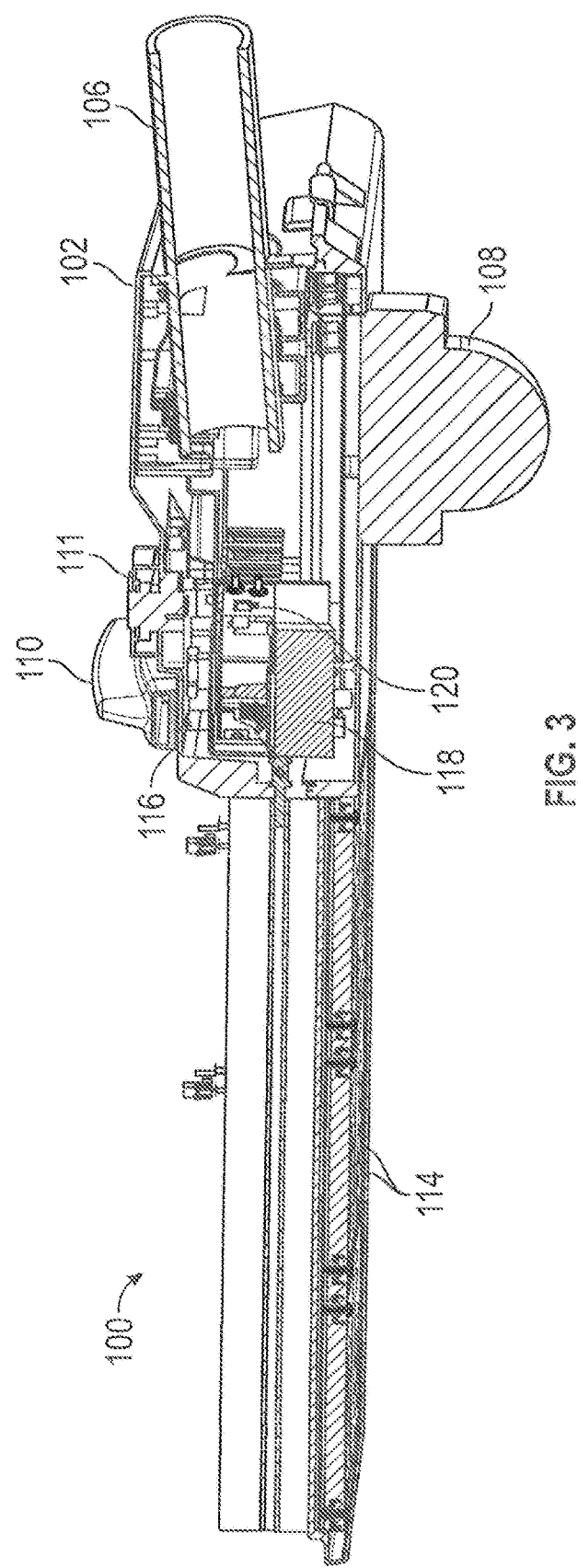
FIG. 3 is a cross-sectional view of a luminaire with an integrated camera in accordance with an example embodiment.

Referring to FIGS. 1-3, an example outdoor luminaire with an integrated camera is illustrated. The luminaire 100 comprises a component housing 102 and light source housing 104. While described as two portions of the luminaire 100, it should be understood that the component housing 102 and the light source housing 104 can be distinct components or can form one continuous body of the luminaire 100. The light source housing 104 comprises heat sink fins 112 and has light source modules 114 attached to the underside of the light source housing. The light source modules 114 are oriented to direct light downward toward an area of illumination, such as a path, a roadway, or a parking area. The light source modules 114 of the example shown in FIG. 1 comprise light emitting diode light sources, however, in other embodiments other types of light sources can be implemented. Additionally, although multiple light source modules 114 are shown in FIGS. 1-3, in other embodiments only a single light source may be used. The luminaire further comprises a mount 106 extending from the component housing 102. The mount 106 is used to attach the luminaire to a structure such as a pole or a building. As such, the luminaire is typically mounted at a height above pedestrians and motor vehicle traffic which provides an advantageous location for a camera integrated into the luminaire.

The example component housing 102 can comprise components on both the exterior and interior of the component housing. A camera 108 is integrated on the underside of the component housing. In the example shown in FIGS. 1-3, the camera 108 is integrated into door 103 which attaches to the component housing 102 with latch 105. In other embodiments, the camera 108 can be located at other positions on the luminaire or multiple cameras can be located at different positions on the luminaire. The example luminaire 100 shown in FIGS. 1-3 also comprises an antenna 110 and a light sensor 111, both of which are mounted on the top side of the component housing 102. The antenna 110 enables wireless communication of data to and from the luminaire 100 while the light sensor 111 can detect ambient light levels for determining when to turn the light source modules 114 on and off. In other embodiments, either or both of the antenna 110 and the light sensor 111 may be removed or may be replaced with other components. For example, in one alternate embodiment, the light sensor 111 can be eliminated because light levels can be detected by the camera 108. In another alternate embodiment, the antenna may be replaced by an alternate communication method such as fiber optic cable or other types of communication lines.

The cross section of the example luminaire 100 shown in FIG. 3 illustrates certain features of the interior of the component housing 102. For example, a power over Ethernet injector 118 and a transceiver 120 can be used in connection with the camera 108. These components will be described in greater detail below in connection with FIGS. 4 and 5. A thermal shield 116 can be placed along the top portion of the interior of the component housing 102. The thermal shield 116 can protect the components in the component housing 102 from heat caused by sunlight directed at the top of the luminaire 100. The thermal shield 116 can comprise one or more of a variety of materials. In one example, the thermal shield 116 can comprise a layer of metallic foil to reflect the sun's radiation. In addition to or as an alternative to the metallic foil, the thermal shield 116 can also comprise a layer of material that provides strength as well as thermal insulation, such as fiberglass. In other example embodiments, other materials can be used as a thermal barrier to protect the components within the component housing 102. The thermal shield 116 can be implemented as a lining throughout the interior surface of the component housing 102 or may be implemented in only portions of the component housing 102 such as along the top inner surface.

The arrangement of the components shown in FIGS. 1-3 can eliminate the need for active cooling devices. Specifically, positioning the camera 108 on the underside of the luminaire 100 allows the camera 108 to be cooled by the air passing along the exterior of the luminaire 100 and the luminaire 100 shades the camera 108 from direct sunlight. The remaining components within the component housing 102 are maintained at a sufficiently cool level by the previously described thermal shield. Additionally, heat generated by the light source modules 114 and their respective power supplies can be dissipated by the heat sink fins 112 located on the top surface of the light source housing 104.

Figure 4:
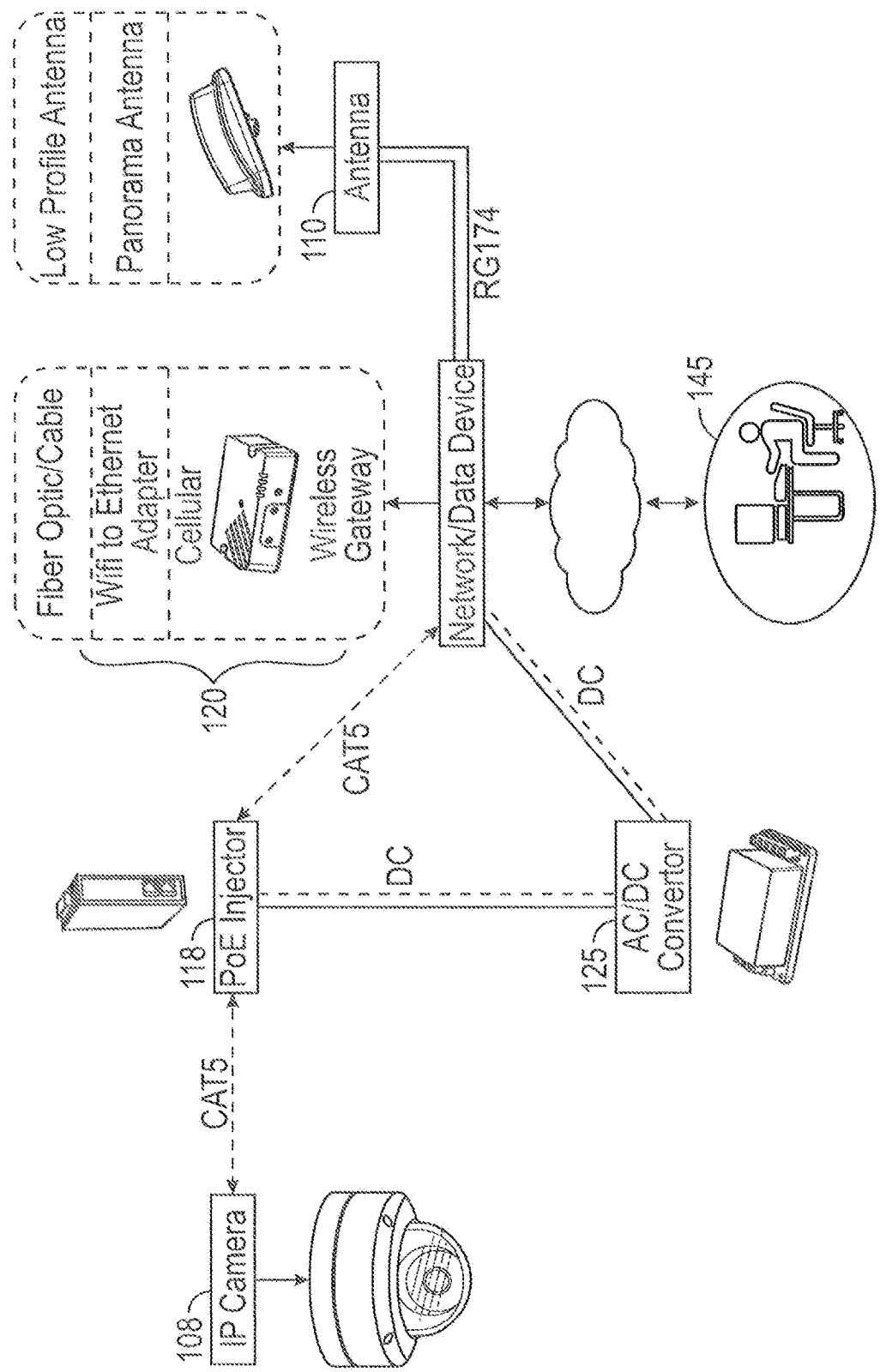
FIG. 4 is a system diagram illustrating components of a luminaire with an integrated camera in accordance with an example embodiment.
Figure 5A:
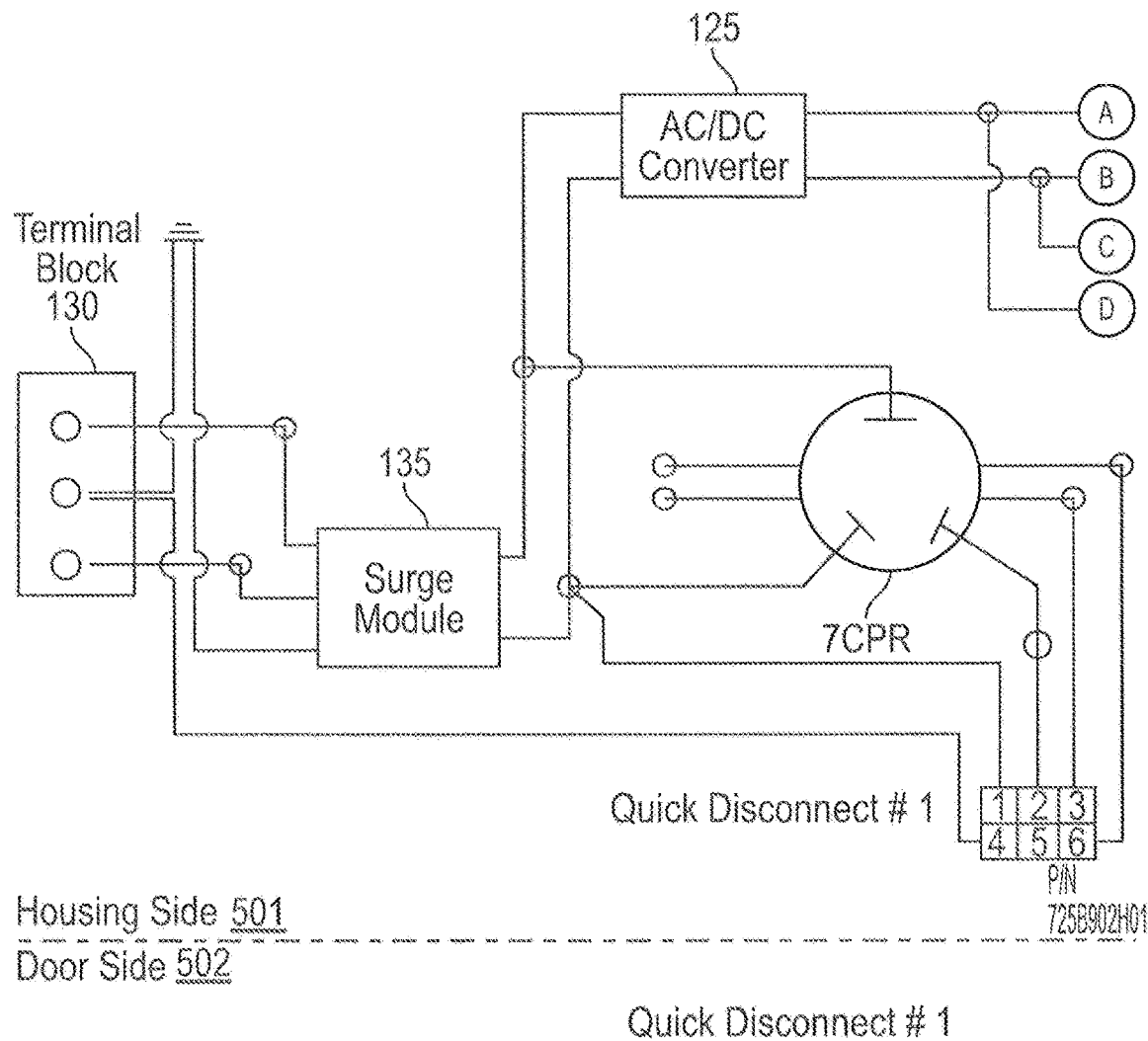
FIGS. 5A and 5B (collectively "FIG. 5") together provide a wiring diagram illustrating components of a luminaire with an integrated camera in accordance with an example embodiment.
Figure 5A:
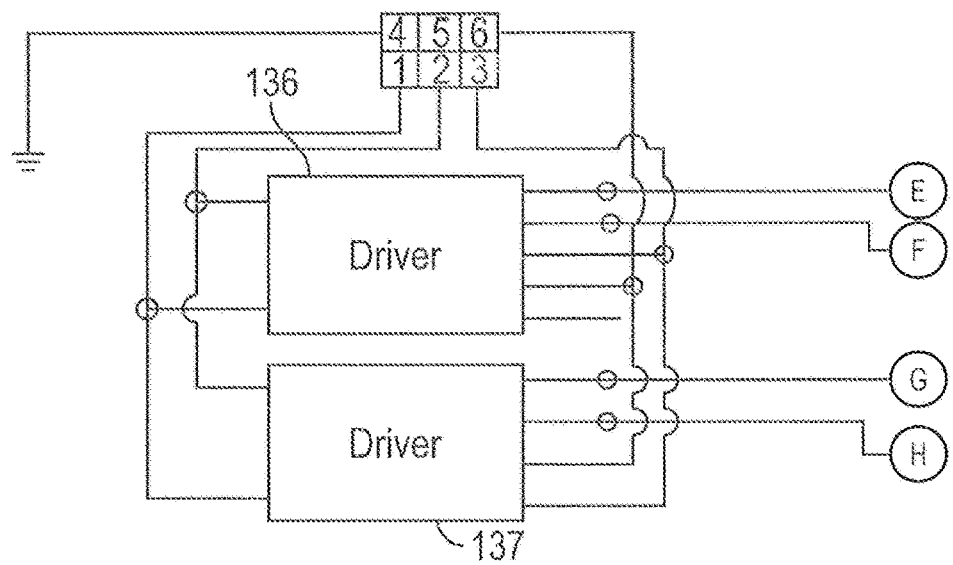
Figure 5B:
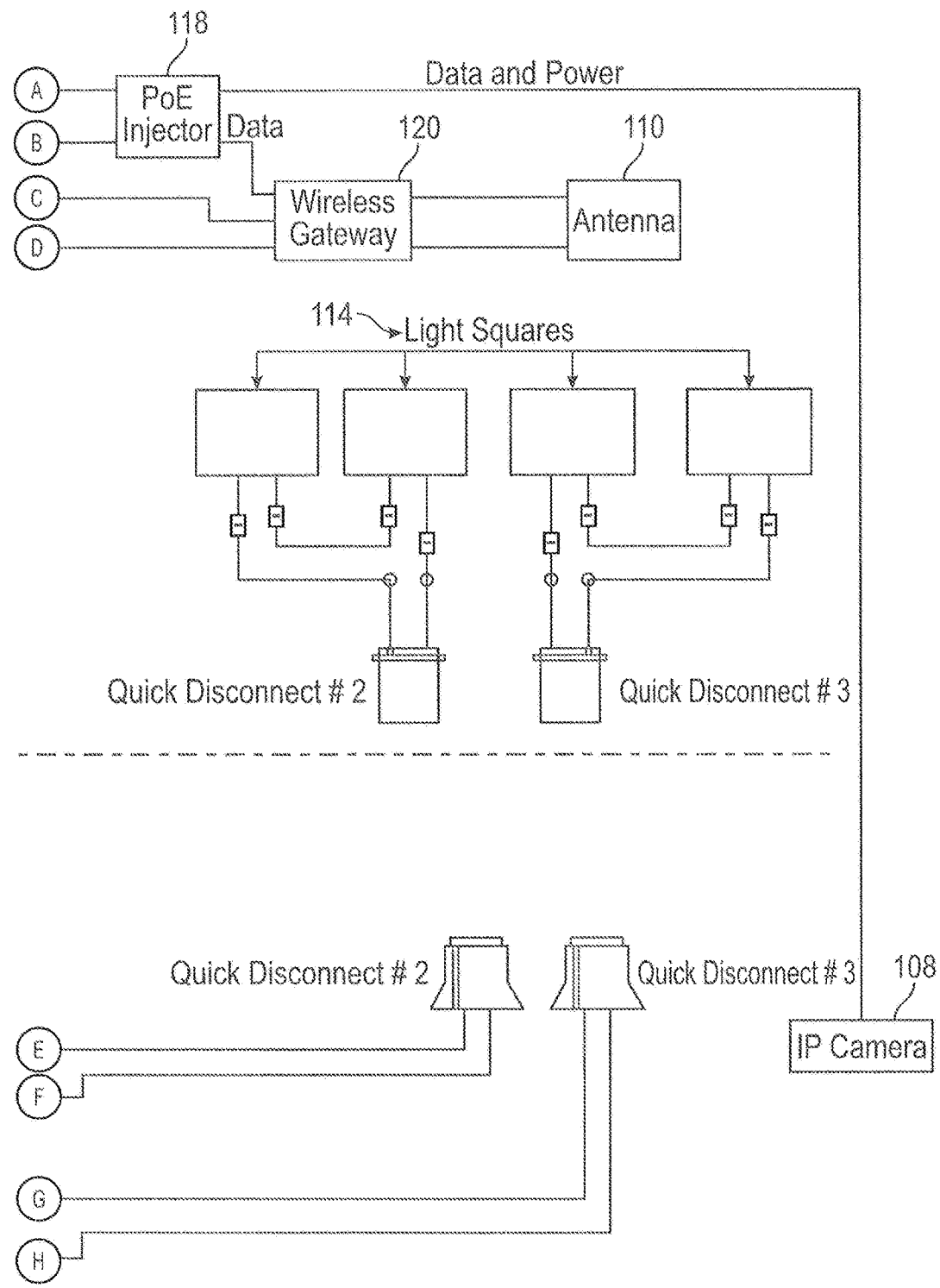

Referring now to FIGS. 4 and 5, components of an example luminaire with an integrated camera are illustrated in accordance with example embodiments of this disclosure. A power source supplies power (e.g. 120V AC, 220V AC, 24V DC, 48V DC) to the luminaire 100 via a terminal block 130. The power source can be line power or power supplied by an alternate source such as batteries or a photovoltaic source. In the example system illustrated in FIG. 5, a surge module 135 is coupled to the terminal block to protect the various electrical components against electrical surges. A pair of connectors can provide power from the surge module 135 to one or more power supplies, such as drivers 136 and 137, that supply power to the light source modules 114. The power supply or driver for a light source module can comprise one or more of an AC to DC converter, a transformer, or a step-down converter (e.g. a buck converter) to convert power to the appropriate level and form for use by the light source module.

Also coupled to the surge module 135 is a power converter 125, such as an AC to DC power converter, that supplies DC power to the transceiver 120 and the power over Ethernet injector 118. In embodiments using a DC power source, the power converter 125 may be unnecessary. Although not shown in FIG. 3 for simplicity, the power converter 125, the surge module 135, and the terminal block 130 can be located within the component housing 102. The power source can provide power to the terminal block 130 via an electrical connection that passes through the mount 106, for example.

The transceiver 120 can be implemented as a variety of components to transmit data from the camera 108 to a remote monitoring site 145. For instance, the transceiver 120 can be implemented as a wireless gateway that communicates over a cellular telephone network, a Wifi network, a Zigbee network, or another wireless network. Alternatively, the transceiver 120 can be implemented as a communications interface to a fiber optic network or other wired communications network. The transceiver 120 can transmit still images and/or video data from the camera 108 to the remote monitoring site 145 for review and evaluation. For example, the remote monitoring site may be associated with law enforcement or a security service and may receive data from cameras integrated into multiple luminaires.

The power over Ethernet injector 118 receives DC power from the power converter 125 and provides both power and data communications to the camera 108 via a wired connection such as a first category 5 Ethernet cable. Any appropriate power over Ethernet communication standard (e.g., IEEE 802.3af-2003, POE+, PoDL, IEEE 802.3bt 4PPoE, UPOE, LTPOE++, etc.) can be used for data communications via the power over Ethernet injector 118. In certain examples, the power over Ethernet injector 118 can be coupled with an Ethernet switch for controlling the flow of data. The power over Ethernet injector 118 can also be coupled to the transceiver 120 via a second wired connection such as a second category 5 Ethernet cable. As such, the power over Ethernet injector can receive data (e.g., images, video) from the camera 108 via the first category 5 Ethernet cable and supply the received data to the transceiver 120 via the second category 5 Ethernet cable. The transceiver 120 can transmit the data received from the camera to a remote monitoring station via a wired or wireless network. In certain embodiments, the data flow may be bi-directional with control signals transmitted from a remote location to the transceiver 120 via the antenna 110 and the control signals transmitted via the second category 5 Ethernet cable, the power over Ethernet injector 118, and the first category 5 Ethernet cable to control the operation of the camera 108. In alternate embodiments, one or more of the foregoing components may be removed or replaced with another component. For instance, in one alternate embodiment, the camera 108 can provide data directly via a direct electrical connection to the transceiver 120 rather than providing the data to the power over Ethernet injector 118 for forwarding to the transceiver 120. Additionally, category 5 Ethernet cables are identified simply as a non-limiting example and in other embodiments other Ethernet cables or other wiring standards can be employed.

FIG. 5, in conjunction with FIGS. 1-3, also illustrates certain of the structural and mechanical advantages of the example luminaire 100. Specifically, the luminaire 100 can be divided into a housing side 501 and a door side 502. As described previously the door 103 is attached to the component housing 102 by latch 105. Locating the camera 108 on the door side 502 and integrating it into the door 103 allows for easy maintenance of the camera 108 or replacement of the camera 108 with a new camera or with other devices. Locating the camera 108 on the door 103 also facilitates retrofitting other luminaires which do not have a camera.

As also shown in FIG. 5, one or more power supplies for the light source module 114 can also be located on the door 103. In the example shown in FIG. 5, two power supplies (drivers 136 and 137) are attached to the door 103. Drivers 136 and 137 can be easily attached to the light source modules 114 and to the power source with quick disconnect connectors. Locating the drivers 136 and 137 on the door 103 facilitates maintenance and replacement of the drivers as needed. While the door is shown on bottom side of the luminaire 100, in alternate embodiments of the luminaire the door could have different shapes or be located at other positions on the luminaire.

Figure 6A:
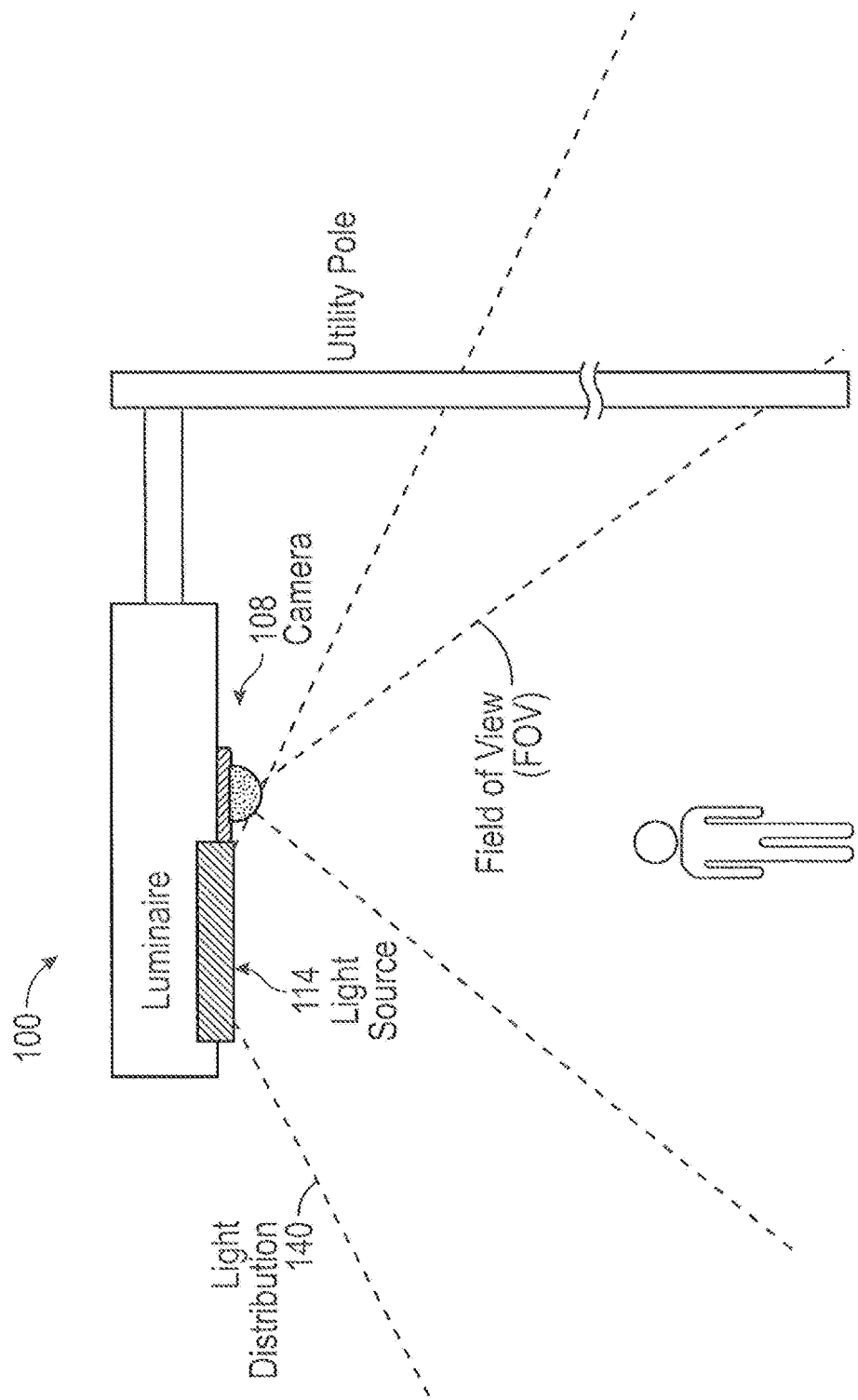
FIGS. 6A and 6B are diagrams illustrating different positions for the camera integrated into the luminaire in accordance with certain example embodiments.
Figure 6B:
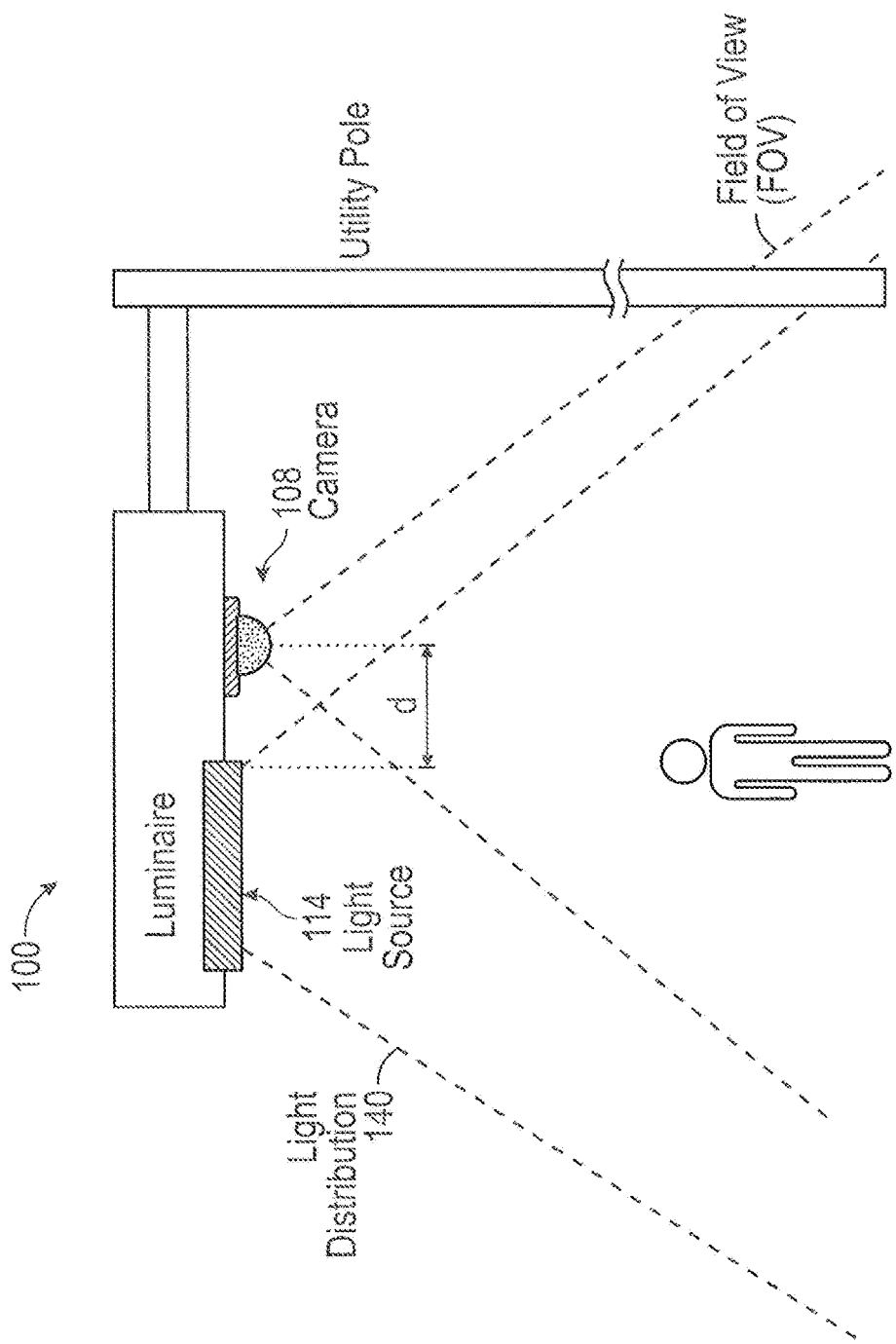

Referring now to FIGS. 6A and 6B, diagrams are provided illustrating different positions for the camera 108 integrated into the luminaire 100. Generally speaking, it is preferred to have a separation of at least some minimum distance or angle between the camera 108 and the light source 114 so that the light from the light source 114 does not interfere with the ability of the camera 108 to capture images. In other words, light from the light source 114 can undesirably "wash out" the images captured by the camera 108.

FIG. 6A illustrates an undesirable position because the camera 108 is located directly adjacent to the light source 114 and a portion of the camera 108 falls within a direct light distribution 140 of the light source 114. The direct light distribution 140 from the light source 114 can be described as having a substantially conical shape. In the preferred approach, the camera 108 is positioned outside the cone of direct light distribution 140 from the light source 114 as illustrated in FIG. 6B. As an alternative approach, the light distribution from the light source 114 can have a threshold intensity level that adversely affects the camera 108. Light from the light source 114 having the threshold intensity level adversely affecting the camera can be described as having a substantially conical shape of certain dimensions determined by the configuration and position of the light source 114 and its components. Therefore, the camera 108 can be disposed as shown in FIG. 6B outside the substantially conical shape defining the light having the threshold intensity level that adversely affects the camera 108.

The positioning of the camera 108 and the light source 114 to avoid "wash out" of the camera's images can be achieved in a variety of ways. As one example shown in FIG. 6B, a certain minimum distance d, such as 3 inches, 4 inches or 5 inches, can be maintained between the light source 114 and the camera 108. Alternatively, the surface of the luminaire on which the light source 114 is mounted (i.e. the light source housing 104) and the surface of the luminaire on which the camera 108 is mounted (i.e. the door 103) can be arranged such that they are at an angle that inhibits interference of light from the light source 114 with the camera 108. For instance, as shown in FIGS. 6A and 6B, surface on which the light source is mounted and the surface on which the camera is mounted have an angle of 180 degrees because the surfaces lie in the same plane. However, to inhibit light from the light source 114 from interfering with the camera 108, the surfaces on which the light source 114 and the camera 108 are located could be at an angle greater than 180 degrees such that the surfaces do not lie in the same plane and so that the light source 114 and the camera 108 are pointed away from each other. In other embodiments, other arrangements can be used to minimize the interference of light from the light source 114 with the camera 108.

While the camera 108 has been described herein as providing images and video that can be transmitted from the luminaire 100 to a remote monitoring site, it should be understood that the camera 108 can also serve other functions. As non-limiting examples, the camera can support functions such as occupancy/vacancy detection for light level adjustments or other environmental controls, daylight detection for light level adjustments, natural versus artificial light comparison for real-time light level tuning, counting the number of people, vehicles, or animals that pass by the camera, following people's directional movements for automatic light level control, sensing intelligent visible light communication from user devices for programming and user controls, facial recognition for identifying individuals, and intelligent gesture control. Additionally, in other embodiments the camera can be replaced with or accompany other devices such as a speaker, a microphone, and an infrared sensor which can be coupled to the power over Ethernet injector 118.

The example luminaire 100 can also include one or more controllers that are stand-alone components or that are integrated with another component such as the power over Ethernet injector 118, the transceiver 120, or the camera 108. FIG. 7 illustrates an example embodiment of a controller for operating a luminaire with an integrated camera. In the example shown in FIG. 7, the controller 700 is implemented with the power over Ethernet injector 118. The components of the controller 700, can include, but are not limited to, a control engine 702, a timer 706, a storage repository 712, a hardware processor 714, a memory 716, and an application interface 720. FIG. 7 also illustrates example connections of the controller 700 to one or more input/output (I/O) devices 724, a user 726, camera 108, wireless gateway 120, and a power supply 722 such as the AC/DC converter 125. A bus (not shown) can allow the various components and devices to communicate with one another. A bus can be one or more of any of several types of bus structures, including a memory bus or memory controller, a peripheral bus, an accelerated graphics port, and a processor or local bus using any of a variety of bus architectures. The components shown in FIG. 7 are not exhaustive, and in some embodiments, one or more of the components shown in FIG. 7 may not be included in an example system. Further, one or more components shown in FIG. 7 can be rearranged.

A user 726 may be any person or entity that interacts with the controller 700 including during the initial commissioning of the luminaire 100 or during operation of the luminaire 100. Examples of a user 726 may include, but are not limited to, an engineer, an appliance or process, an electrician, an instrumentation and controls technician, a mechanic, and an operator. There can be one or multiple users 726. The user 726 can use a user system (not shown), which may include a display (e.g., a GUI). The user 726 can interact with (e.g., sends data to, receives data from) the controller 700 via the application interface 720 (described below) and can also interact with other components including the camera 108, the input/output devices 724, the wireless gateway 120, and/or the power supply 722. Interaction between the user 726, the controller 700, the camera 108, the input/output devices 724, the wireless gateway 120, and the power supply 722 can be conducted using signal transfer links 734.

Each signal transfer link 734 can include wired (e.g., Class 1 electrical cables, Class 2 electrical cables, Ethernet cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a signal transfer link 734 can be (or include) an Ethernet cable that connects the controller 700 and the camera 108. A signal transfer link 734 can transmit signals (e.g., communication signals, control signals, data, and power signals) between the controller 700, the user 726, the camera 108, the input/output devices 724, the wireless gateway 120, and/or the power supply 722.

The power supply 722 provides power to one or more components, such as the light modules 114, the camera 108, and the wireless gateway 120. The power supply 722 can include one or more components (e.g., a transformer, a diode bridge, an inverter, a converter) that receives power (for example, through an electrical cable) from an independent power source external to the luminaire 100 and generates power of a type (e.g., AC, DC) and level (e.g., 12V, 24V, 120V) that can be used by one or more components of the luminaire.

The storage repository 712 can be a persistent storage device (or set of devices) that stores software and data used to assist the controller 700 in communicating with the user 726, the power supply 722, and other components of the coating system. In one or more example embodiments, the storage repository 712 stores one or more protocols 728, algorithms 730, and stored data 732. For example, a protocol 728 and/or an algorithm 730 can dictate when an operating mode for the luminaire is to be entered and for how long. Such protocols 728 and algorithms 730 can be based on information received from sensors 742, from data entered from a user 726, or may be static variables that are programed into the controller 700. Stored data 732 can be any data associated with the luminaire (including any components thereof), any measurements taken by sensors 742, time measured by the timer 706, adjustments to an algorithm 730, threshold values, user preferences, default values, results of previously run or calculated algorithms 730, and/or any other suitable data.

The storage repository 712 can be operatively connected to the control engine 702. In one or more example embodiments, the control engine 702 includes functionality to communicate with the user 726, the power supply 722, and other components of the luminaire. More specifically, the control engine 702 sends information to and/or receives information from the storage repository 712 in order to communicate with the user 726, the power supply 722, and other components.

As another example, the control engine 702 can acquire the current time using the timer 706. The timer 706 can enable the controller 700 to control the components of the luminaire. As yet another example, the control engine 702 can direct a sensor 742, such as light sensor 111, to measure a parameter (e.g., ambient light) and send the measurement by reply to the control engine 702. In some cases, the control engine 702 of the controller 700 can control the position and operation of the camera 108 or other input/output devices connected to the luminaire.

The hardware processor 714 of the controller 700 executes software, algorithms 730, and firmware in accordance with one or more example embodiments. Specifically, the hardware processor 714 can execute software on the control engine 702 or any other portion of the controller 700, as well as software used by the user 726, or the power supply 722. The hardware processor 714 can be an integrated circuit, a central processing unit, a multi-core processing chip, SoC, a multi-chip module including multiple multi-core processing chips, or other hardware processor in one or more example embodiments. The hardware processor 714 is known by other names, including but not limited to a computer processor, a microprocessor, and a multi-core processor.

In one or more example embodiments, the hardware processor 714 executes software instructions stored in memory 716. The memory 716 includes one or more cache memories, main memory, and/or any other suitable type of memory. The memory 716 can include volatile and/or non-volatile memory.

In certain example embodiments, the controller 700 does not include a hardware processor 714. In such a case, the controller 700 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 700 (or portions thereof) to be programmable and function according to certain logic rules and thresholds without the use of a hardware processor.

One or more I/O devices 724 allow a user to enter commands and information to the luminaire, and also allow information to be presented to the user and/or other components or devices.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media, such as the memory 716 or storage device 712.

Example embodiments provide a number of benefits. Examples of such benefits can include, but are not limited to, more efficient installation, configuration, control, replacement, modification, and maintenance of a system of cameras; improved electrical and operational efficiency; compliance with one or more applicable standards and/or regulations; lower maintenance costs, increased flexibility in system design and implementation; and reduced cost of labor and materials. Example embodiments can be used for installations of new luminaires or retrofitted with existing luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A luminaire comprising:
   a terminal block that receives power from a power source;
   a light source power supply electrically coupled to the terminal block and to a light source;
   a power converter electrically coupled to the terminal block and to a power over Ethernet injector,
   a camera electrically coupled to the power over Ethernet injector, wherein the camera and the light source are disposed on the luminaire such that the camera is located outside a direct light distribution of the light source; and
   a transceiver electrically coupled to the power converter.

2. The luminaire of claim 1, wherein the light source power supply is a driver and the light source is one or more light emitting diodes.

3. The luminaire of claim 1, wherein the power converter is an AC to DC power converter.

4. The luminaire of claim 1, wherein the power over Ethernet injector supplies power to and receives data from the camera.

5. The luminaire of claim 1, wherein the transceiver is electrically coupled to the power over Ethernet injector and the power over Ethernet injector supplies data from the camera to the transceiver.

6. The luminaire of claim 1, wherein the transceiver is electrically coupled to the camera and receives data from the camera.

7. The luminaire of claim 6, wherein the transceiver transmits the data received from the camera via one of a cellular telephone network, a Wifi network, a Zigbee network, and a fiber optic network.

8. The luminaire of claim 6, wherein the transceiver receives control signals from a remote location and provides the control signals to the camera.

9. The luminaire of claim 1, wherein the camera and the light source are mounted on a bottom face of the luminaire.

10. The luminaire of claim 1,
    wherein the power over Ethernet injector and the transceiver are disposed within a component housing of the luminaire and attached to an interior housing side of the component housing; and
    wherein the camera is disposed within the component housing and attached to a door of the component housing.

11. The luminaire of claim 10, wherein the component housing comprises a thermal shield.

12. The luminaire of claim 11, wherein the thermal shield is disposed on an interior top surface of the component housing.

13. A luminaire comprising:
    a component housing, the component housing defining a cavity that comprises:
       a terminal block that receives power from a power source,
       a power converter electrically coupled to the terminal block,
       a power over Ethernet injector electrically coupled to the power converter,
       a transceiver that receives power from the power converter, and
       a thermal shield;
    a light source power supply electrically coupled to the terminal block and to a light source; and
    a camera disposed on an underside of the luminaire and outside a zone of direct light from the light source.

14. The luminaire of claim 13, wherein the thermal shield is disposed on an inner top surface of the component housing.

15. The luminaire of claim 13, wherein the thermal shield comprises a layer of metallic foil and a layer of fiberglass.

16. The luminaire of claim 13, further comprising a camera electrically coupled to the power over Ethernet injector.

17. The luminaire of claim 16, wherein the camera supplies data to the transceiver.

18. A luminaire comprising:
a terminal block that receives power from a power source;
a light source power supply electrically coupled to the terminal block and to a light source;
a power converter electrically coupled to the terminal block and to a power over Ethernet injector;
a camera electrically coupled to the power over Ethernet injector;
a transceiver electrically coupled to the power converter;
wherein the power over Ethernet injector and the transceiver are disposed within a component housing of the luminaire and attached to an interior housing side of the component housing; and
wherein the camera is disposed within the component housing and attached to a door of the component housing.

19. The luminaire of claim 18, wherein the component housing further comprises a thermal shield.

20. The luminaire of claim 18, wherein the camera is disposed such that the camera is located outside a direct light distribution of the light source.

\* \* \* \* \*